United States Patent
Urnes, Sr.

(10) Patent No.: US 8,028,952 B2
(45) Date of Patent: Oct. 4, 2011

(54) SYSTEM FOR SHIPBOARD LAUNCH AND RECOVERY OF UNMANNED AERIAL VEHICLE (UAV) AIRCRAFT AND METHOD THEREFOR

(75) Inventor: James M. Urnes, Sr., Bridgeton, MO (US)

(73) Assignee: The Boeing Company, Chicago, IL (US)

( * ) Notice: Subject to any disclaimer, the term of this patent is extended or adjusted under 35 U.S.C. 154(b) by 790 days.

(21) Appl. No.: 12/059,389

(22) Filed: Mar. 31, 2008

(65) Prior Publication Data

US 2009/0242693 A1    Oct. 1, 2009

(51) Int. Cl.
*B64F 1/00* (2006.01)

(52) U.S. Cl. .......... 244/63; 244/110 R; 244/110 F; 244/116; 114/261

(58) Field of Classification Search .......... 244/110 C, 244/110 F, 110 G, 110 R, 116, 63
See application file for complete search history.

(56) References Cited

U.S. PATENT DOCUMENTS

| | | |
|---|---|---|
| 965,881 A | 8/1910 | Draper |
| 968,339 A | 8/1910 | Geraldson |
| 1,144,505 A | 6/1915 | Stefman |
| 1,383,595 A | 7/1921 | Black |
| 1,428,163 A | 9/1922 | Harriss |
| 1,731,091 A | 10/1929 | Belleville |
| 1,802,254 A * | 4/1931 | Holland .......... 244/63 |
| 1,836,010 A | 12/1931 | Audrain |
| 1,842,432 A | 1/1932 | Stanton |
| 1,912,723 A | 6/1933 | Perkins |
| 2,299,582 A * | 10/1942 | Lohse .......... 446/241 |
| 2,409,763 A * | 10/1946 | Janiewski .......... 244/63 |
| 2,448,209 A | 8/1948 | Boyer |
| 2,783,957 A | 3/1957 | O'Neil, et al. |
| 2,872,136 A | 2/1959 | Cotton |
| 2,919,871 A | 1/1960 | Sorenson |
| 2,919,872 A | 1/1960 | Nord |
| 2,989,272 A | 6/1961 | Sheaffer |
| 2,994,496 A | 8/1961 | Flomehoft |
| 3,001,743 A | 9/1961 | Simmons |
| 3,045,958 A | 7/1962 | Mackie |

(Continued)

FOREIGN PATENT DOCUMENTS

EP    1 233 905 AO    2/2001

OTHER PUBLICATIONS

H628—United States Statutory Invention Registration—Mcingvale—Universal Automatic Landing System for Remote Piloted Vehicles—Apr. 4, 1989.

(Continued)

*Primary Examiner* — Tien Dinh
*Assistant Examiner* — Michael Kreiner
(74) *Attorney, Agent, or Firm* — Weiss & Moy, P.C.

(57) ABSTRACT

A system to launch and recover an Unmanned Aerial Vehicle (UAV) aircraft has a pole member attached to a deck of a ship. An arm member is attached to the pole member and extends away from the pole member in an approximately horizontal direction. The arm member is able to move rotationally and vertically on the pole member. An attachment mechanism is attached to a distal end of the arm member for holding and capturing the UAV aircraft. Momentum of the UAV aircraft causes the arm member to move rotationally around and vertically on the pole member when the UAV aircraft is coupled to the attachment mechanism.

20 Claims, 4 Drawing Sheets

U.S. PATENT DOCUMENTS

| | | | |
|---|---|---|---|
| 3,118,640 A | 1/1964 | Lav et al. | |
| 3,497,166 A | 2/1967 | Girolamo | |
| 3,383,076 A | 5/1968 | Van Zelm, et al. | |
| 3,468,500 A | 9/1969 | Carlsson | |
| 3,481,565 A | 12/1969 | Marcheron | |
| 3,495,792 A | 2/1970 | Merle | |
| 3,502,289 A | 3/1970 | Kelly et al. | |
| 3,531,065 A | 9/1970 | Brown | |
| 3,534,929 A | 10/1970 | Johansen | |
| 3,549,110 A | 12/1970 | Cotton | |
| 3,559,697 A | 2/1971 | Whalen | |
| 3,582,024 A | 6/1971 | Rhodes | |
| 3,712,565 A | 1/1973 | Walander | |
| 3,989,206 A * | 11/1976 | Gregory | 244/63 |
| 4,147,317 A | 4/1979 | Mayhew et al. | |
| 4,236,686 A | 12/1980 | Barthelme et al. | |
| 4,311,290 A | 1/1982 | Koper | |
| 4,393,996 A | 7/1983 | Tuman | |
| 4,523,729 A | 6/1985 | Frick | |
| 4,566,658 A | 1/1986 | DiGiovanniantonio | |
| 4,753,400 A | 6/1988 | Reuter et al. | |
| 4,790,497 A | 12/1988 | Yoffe | |
| 4,979,701 A | 12/1990 | Colarik et al. | |
| 5,042,750 A | 8/1991 | Winter | |
| 5,054,717 A | 10/1991 | Taylor | |
| 5,314,155 A | 5/1994 | Behrendt et al. | |
| 5,560,568 A | 10/1996 | Schmittle | |
| 5,979,825 A | 11/1999 | Cox et al. | |
| 6,264,140 B1 | 7/2001 | McGeer et al. | |
| 6,394,390 B1 | 5/2002 | Colarik et al. | |
| 6,581,875 B2 | 6/2003 | Colarik | |
| 6,604,732 B1 | 8/2003 | Brinker | |
| 6,758,440 B1 | 7/2004 | Repp et al. | |
| 6,779,756 B1 | 8/2004 | Lopez | |
| 6,874,729 B1 | 4/2005 | McDonnell | |
| 6,981,673 B1 | 1/2006 | Sowell et al. | |
| 7,059,564 B2 | 6/2006 | Dennis | |
| 7,097,137 B2 | 8/2006 | McDonnell | |
| 7,219,856 B2 | 5/2007 | Watts et al. | |
| 7,510,145 B2 * | 3/2009 | Snediker | 244/110 F |
| 2003/0178530 A1 | 9/2003 | Tartaglia et al. | |
| 2005/0017129 A1 | 1/2005 | McDonnell | |
| 2005/0230536 A1 | 10/2005 | Dennis et al. | |
| 2006/0131462 A1 | 6/2006 | Holland et al. | |
| 2006/0175466 A1 | 8/2006 | Snediker | |
| 2008/0308673 A1 | 12/2008 | Liu | |
| 2009/0224097 A1 * | 9/2009 | Kariv | 244/63 |

OTHER PUBLICATIONS http://www.boeing.com/new/releases/2004/q2/nr_040511m.html—Boeing—Scaneagle UAV Launched From Ship; Completes Historic Autonomous—May 11, 2004—Seattle, Washington, USA .

* cited by examiner

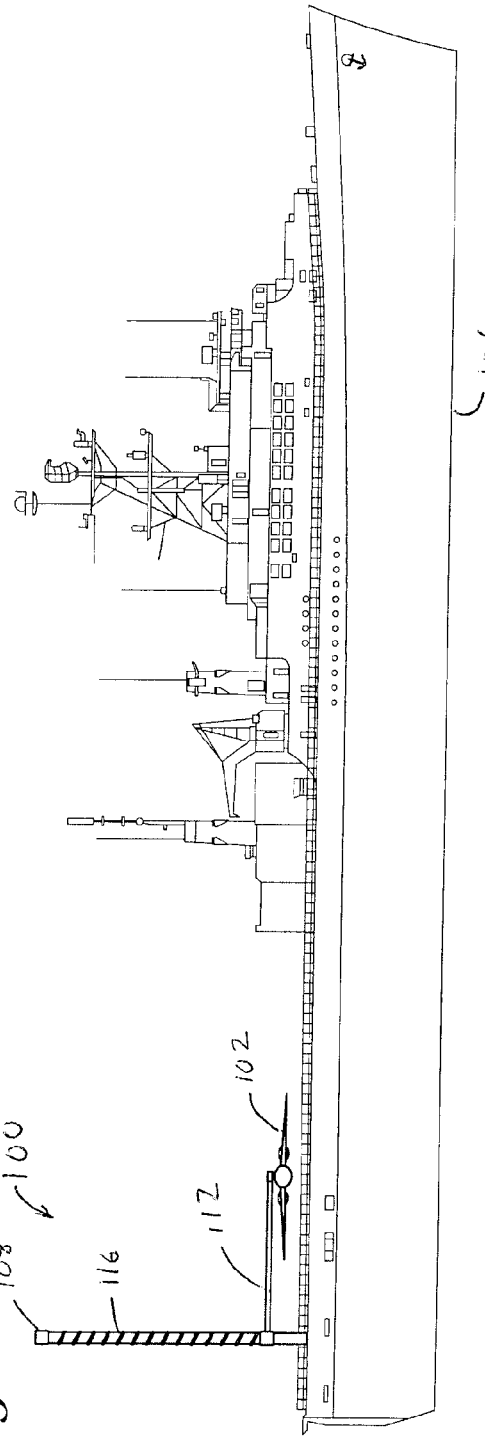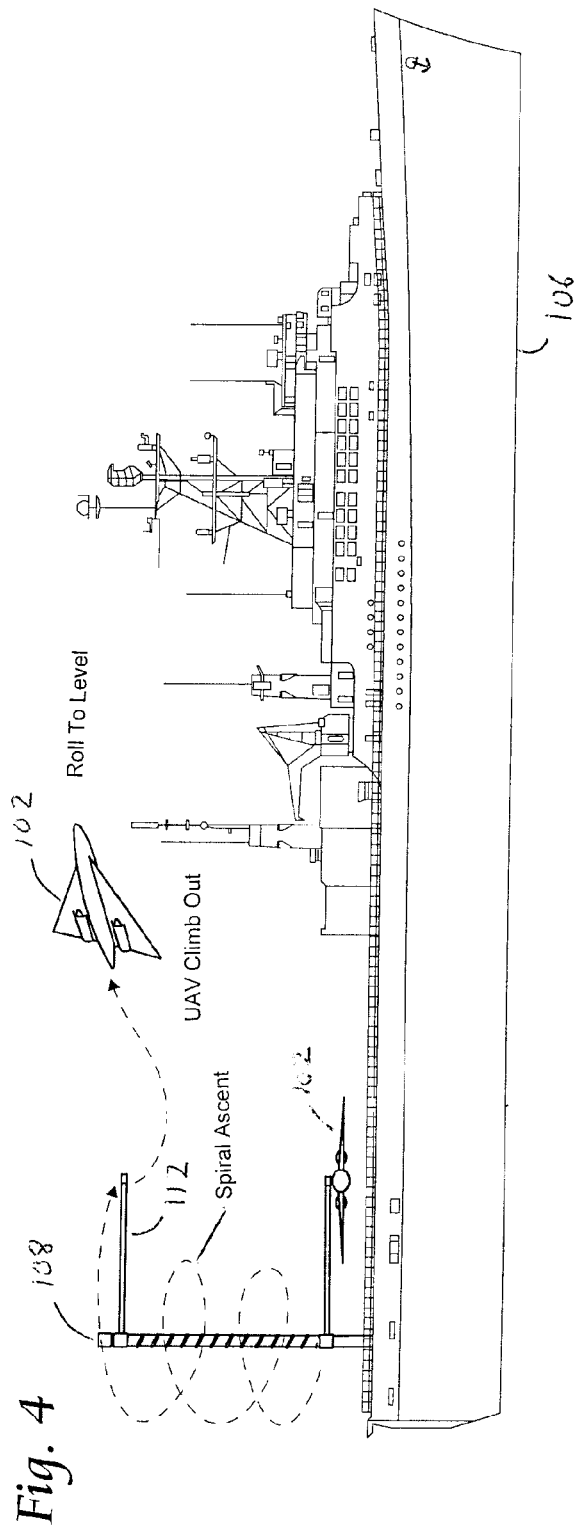

SYSTEM FOR SHIPBOARD LAUNCH AND RECOVERY OF UNMANNED AERIAL VEHICLE (UAV) AIRCRAFT AND METHOD THEREFOR

BACKGROUND

Embodiments of this disclosure relate generally to an unmanned aerial vehicle (UAV) aircraft, and more particularly, to a system and method for shipboard launch and recovery of a UAV aircraft that does not require a flight deck/runway.

Presently, in order to launch and land a UAV aircraft from a ship, a flight deck is required. The flight deck is generally considered the upper level of an aircraft carrier where the aircraft take off and land. Alternatively, on smaller ships which do not have aviation as a primary mission, the landing area for helicopters and Vertical Take Off and Landing (VTOL) aircraft is also referred to as the flight deck. Thus, all UAV aircraft requires some type of flight deck for launch and recovery from a ship.

For non high lift UAV aircraft, an aircraft catapult is needed to launch the UAV aircraft from the ship. An aircraft catapult consists of a track built into the flight deck. A shuttle device is attached to the track and to the UAV aircraft to be launched. In general, the shuttle is attached to the nose of the UAV aircraft. When the UAV is set to launch, a release bar holds the UAV aircraft in place as steam pressure builds up to a predetermined level. At this point, the release bar is unlatched freeing the shuttle to pull the UAV aircraft along the deck at high speed. The shuttle will pull the UAV aircraft in order to obtain sufficient velocity for takeoff. The aircraft catapult and flight deck results in added weight, less equipment space on the deck, and increased support cost of the ship.

When landing a non high lift UAV aircraft on a ship, an arresting gear is generally used to decelerate the UAL aircraft as it lands. The arresting gear is generally used to decelerate the UAL aircraft as it lands. The arresting gear generally comprises a set of cables strung across the flight. The cables are attached to hydraulic cylinders. The hydraulic cylinders are connected to a pressure vessel via a special valve. When the UAV aircraft lands, the tailhook catches into one of the cable and pulls on the cable. The tension cased by the tailhook pulling on the cable compresses the hydraulic cylinders and pulls the UAV aircraft to a stop. For light weight UAV aircraft, a wire snare mounted on poles is generally used to catch the tailhook of the UAV aircraft. The arresting gear further adds weight and increases support cost of the ship.

For all UAV aircraft, a landing gear and retraction system are required. Furthermore, for high lift UAV aircraft, high lift devices are required for launch and landing. Additional structure is needed on the UAV to allow for the high structural loads that occur due to catapult acceleration loads for launch and for high impact vertical and longitudinal forces on landing and the hook arrestment deceleration. The landing gear and retraction system, the high load structure for catapult and landing arrestment, and the high lift devices increase the cost and weight of the UAV aircraft. Furthermore, the landing gear and retraction system and the high lift devices require high strength flight deck structure for launch loads and deck impact on landing. This results in added weight and increased support cost of the ship.

Therefore, it would be desirable to provide a system and method that overcomes the above problems. The system and method would allow for shipboard launch and recovery of a UAV aircraft without the use of flight deck/runway.

SUMMARY

A system to launch and recover an Unmanned Aerial Vehicle (UAV) aircraft has a pole member attached to a deck of a ship. An arm member is attached to the pole member and extends away from the pole member in an approximately horizontal direction. The arm member is able to move rotationally and vertically on the pole member. An attachment mechanism is attached to a distal end of the arm member for holding and capturing the UAV aircraft. Momentum of the UAV aircraft causes the arm member to move rotationally around and vertically on the pole member when the UAV aircraft is coupled to the attachment mechanism.

A method for launching an Unmanned Aerial Vehicle (UAV) aircraft comprises: attaching the UAV aircraft to an approximately horizontal arm member, the approximately horizontal arm moveably coupled to an approximately vertical pole member; moving the horizontal arm in a spiral direction on the approximately vertical pole member; and releasing the UAV aircraft from the approximately horizontal arm member when the UAV aircraft reaches launch airspeed.

A method of recovering an Unmanned Aerial Vehicle (UAV) aircraft comprising: rotating an arm member on an approximately vertical pole member to a positioned approximately 90 degrees from a centerline of a deck, and at a top section of the approximately vertical pole member; capturing the UAV aircraft at a distal end of the arm member; and descending the arm member in a circular spiral down the vertical pole to reduce airspeed of the UAV aircraft.

The features, functions, and advantages can be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein:

FIG. 3 is a side view of the system for shipboard launch and recovery of a UAV aircraft depicted in FIG. 1;

FIG. 4 is a side view depicting launching of a UAV aircraft using the system of FIG. 1;

DETAILED DESCRIPTION

Figure 1:
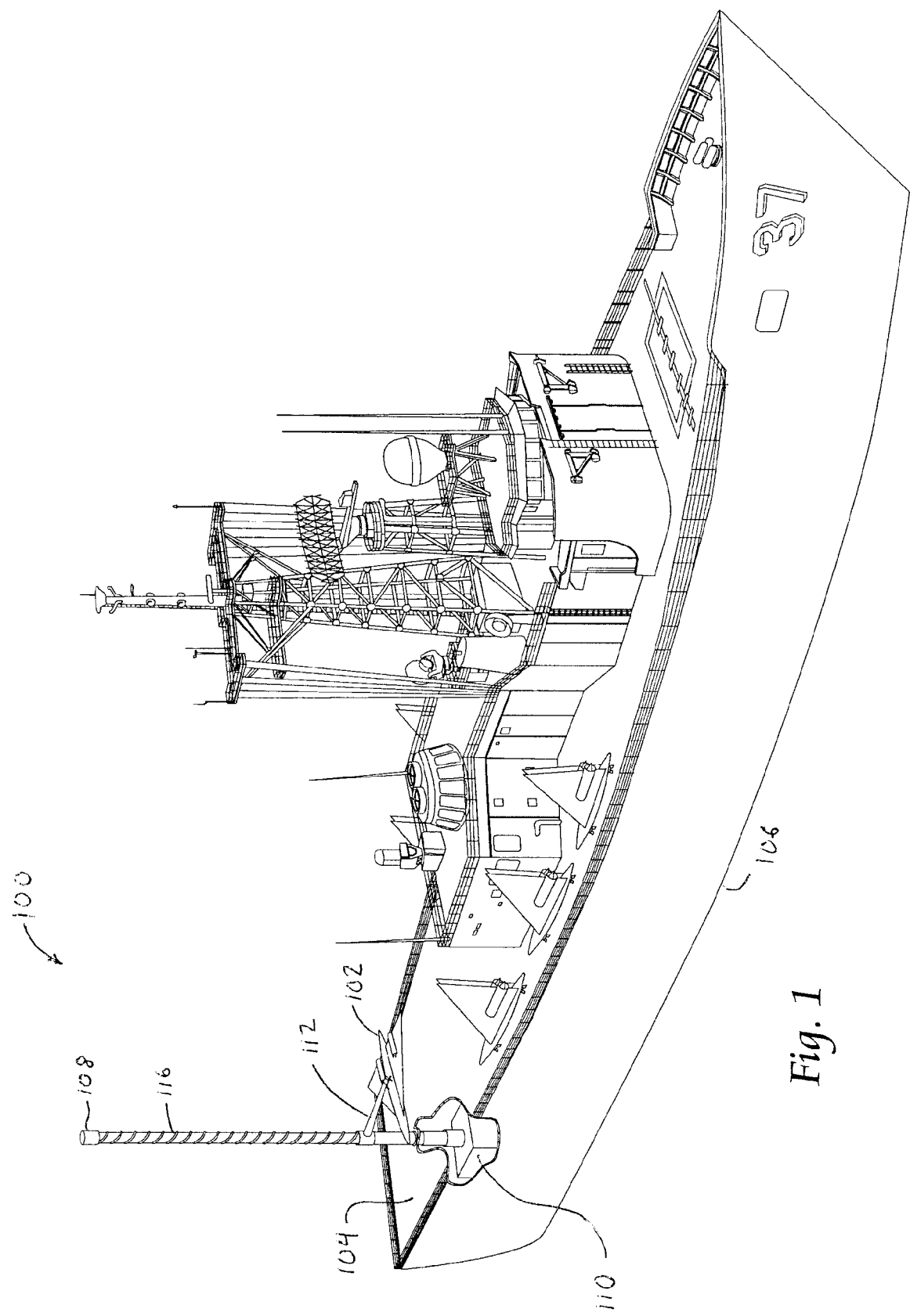
FIG. 1 is an elevated perspective view of a system for shipboard launch and recovery of a UAV aircraft.
Figure 2:
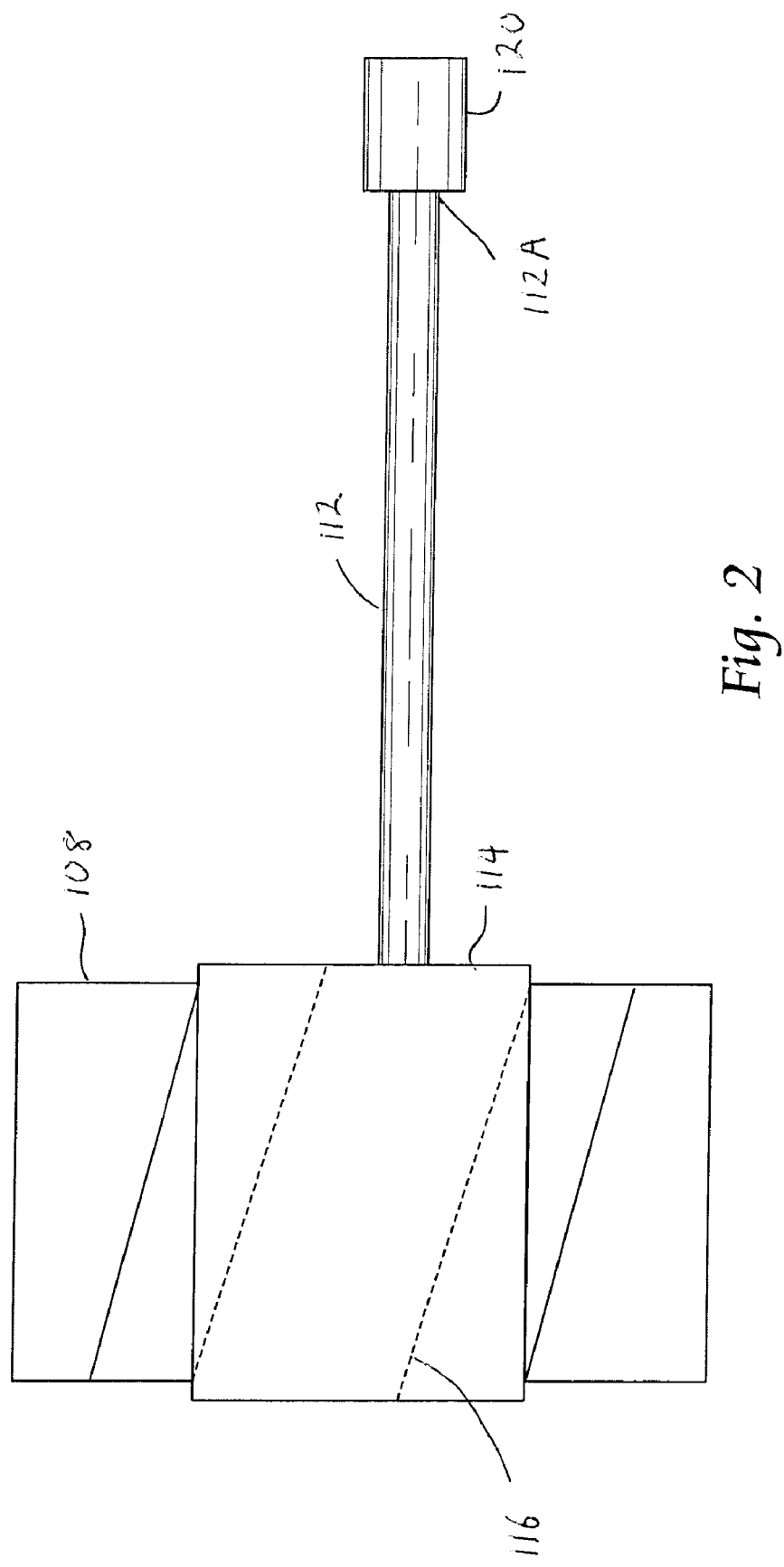
FIG. 2 is a magnified view of the vertical boom and horizontal arm of the system depicted in FIG. 1.

With reference now to FIGS. 1-3, a system 100 for shipboard launch and recovery of a UAV aircraft 102 is shown. The system 100 provides a means for launch and recovery of the UAV aircraft 102 without the need for flight deck or runway. The system 100 further eliminates a high strength structure required to withstand launch loads and deck impact on landing thereby reducing the weight and support cost of a ship launching and recovering the UAV aircraft 102. The system 100 further reduces the structural weight of the UAV aircraft 102 by eliminating the need for a landing gear, a landing gear retraction system, and high lift devices for the UAV aircraft 102. The system 100 offers expanded capabilities for UAV aircraft 102 operations, especially fixed wing UAV aircraft 102, providing safe and reliable control in low visibility weather, day or night operations, and control during very rough sea conditions that cause large motions of the ship 106 during recovery operations.

The system 100 has a pole member 108 coupled to a main deck 104 of a ship 106. The pole member 108 extends up and away from the main deck 104 in an approximately vertical direction. The pole member 108 may be positioned anywhere on the main deck 104. In FIG. 1, the pole member 108 is shown to be located in the aft section of the ship 106. However, the pole member 108 may be located in other areas of the main deck 104.

In accordance with one embodiment, the pole member 108 may be retractable. In this embodiment, a bottom section of the pole member 108 may be coupled to a lift device 110. The lift device 110, such as a hydraulic lift or the like, is positioned on a lower deck of the ship 106 below the main deck 104. An opening in the main deck 104 allows the lift device 110 to raise and lower the height of the pole member 108 above the main deck 104. Alternatively, in accordance with another embodiment, the pole member 108 may a telescoping pole. Thus, different sections of the pole member 108 may be extended or retracted to adjust the height of the pole member 108. In this embodiment, the pole member 108 may be attached to the main deck 104. Alternatively, the pole member 108 would be attached to a lower deck and an opening in the main deck 104 would allow the different sections of the pole member 108 to be extended or retracted to raise and lower the height of the pole member 108 above the main deck 104. The above are given as examples, and other devices/mechanisms may be used to raise and lower the height of the pole member 108 above the main deck 104 without departing from the spirit and scope.

An arm member 112 is coupled to the pole member 108. The arm member 112 will extend away from the pole member 108 in an approximately horizontal direction. The arm member 112 is coupled to the pole member 108 to allow the arm member 112 to rotate about the pole member 108 using the pole member 108 as a rotational axis as well as to allow the arm member 112 to move vertically up and down the pole member 108.

In accordance with one embodiment, in order to move the arm member 112 rotationally and vertically on the pole member 108, a sleeve member 114 is inserted onto the pole member 108. The sleeve member 114 is slidably and rotatably connected to the pole member 108. The arm member 112 is attached to the sleeve member 114 and extends away from the sleeve member 114 in an approximately horizontal direction. The sleeve member 114 allows the arm member 112 to rotate around and move vertically up and down the pole member 108.

In accordance with another embodiment, a track 116 may be formed in the pole member 108 to aid the arm member 112 in moving rotationally and vertically on the pole member 108. The track 116 will run spirally from a top section of the pole member 108 to a bottom section of the pole member 108. The track 116 may be used in an embodiment where just the arm member 112 is coupled to the track 116 or alternatively in the embodiment having the sleeve member 114 wherein the sleeve member 114 is attached to the track 116. In either embodiment, a roller device 118 may be used to move the arm member 112 or alternatively the sleeve member 114 along the track 116.

Attached to a distal end 112A of the arm member 112 is an attachment device 120. The attachment device 120 is used to secure the UAV aircraft 102 to the arm member 112 during takeoff of the UAV aircraft 102 and aid in capturing the UAV aircraft 102 during recovery of the UAV aircraft 102. The attachment device 120 may be a clamping mechanism, a hook device, or the like. The listing of the different attachment devices 120 is given as examples and should not be seen in a limiting scope.

Figure 5:
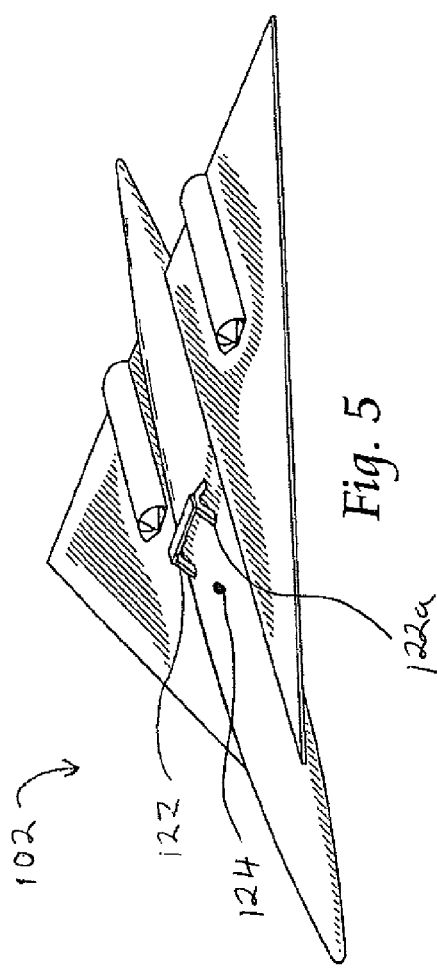
FIG. 5 is an elevated perspective view of a capture assembly used with the UAV aircraft using the system of FIG. 1.

Referring to FIG. 5, an elevated perspective view of UAV aircraft 102 is shown. The UAV aircraft 102 has a capture assembly 122. The capture assembly 122 is used to secure the UAV aircraft 102 to the attachment device 120 so the main structure of the UAV aircraft 102 will not be damaged and further to aid in the attachment device 120 capturing the UAV aircraft 102 during recovery. The capture assembly 122 is generally located near the center of gravity of the aircraft. This provides for a more stability during launching and recovery of the UAV aircraft 102. The capture assembly 122 is generally a retractable device which can be raised and lowered on the UAV aircraft 102. In general, the capture assembly 122 is lowered when the UAV aircraft 102 is in flight to allow the UAV aircraft 102 to be more aerodynamic.

In operation, because of the relationship between the arm member 112 and the pole member 108, the pole member 108 should be located in an area of the main deck 104 where there is sufficient room to allow arm member 112 to rotate about pole member 108 as well as to move vertically along the pole member 108 in an unobstructed manner. In accordance with one embodiment, the pole member 108 is generally located along a centerline that runs from the bow to the stern of the ship.

Referring to FIG. 4, launching of the UAV aircraft 102 using the system 100 will be described. Flight control of the UAV aircraft 102 such as adjusting the flight control surfaces and adjusting airspeed during the launch and flight of the UAV aircraft 102 may be accomplished remotely or programmed into the control system of the UAV aircraft 102.

Prior to launching the UAV aircraft 102, the UAV aircraft 102 is moved to a location on the main deck 104 that is 90 degrees to the centerline of the main deck 104 and is perpendicular to the arm member 112 of the system 100. The UAV aircraft 102 is attached to the arm member 112 by securing the attachment device 120 of the arm member 112 to the capture assembly 122 on the UAV aircraft 102. The propulsion system of the UAV aircraft 102 is activated and maximum power is commanded.

Upon launch, the horizontal arm member 112 is free to move about the pole member 108. The horizontal arm member 112 will generally move in an upward spiral direction on the pole member 108. As stated before, a track 116 may be formed in the pole member 108 to aid the arm member 112 in moving spirally on the pole member 108.

The UAV aircraft 102 accelerates along the circular spiral path, ascending upward while tethered to the attachment device 120 of the arm member 112 via the capture assembly 122 on the UAV aircraft 102. By adjusting the flight control surfaces of the UAV aircraft 102, the attitude of the UAV aircraft 102 is changed such that the load at the capture assembly 122 is normal to the plane containing the wing axis and the fuselage axis (i.e. the x-y plane), and the load on the arm member 112 is primarily along the axis of the arm. This is done by maintaining the bank angle of the UAV aircraft 102 to the required schedule pattern using the control surfaces of the UAV aircraft 102. The angle of attack of the UAV aircraft 102 is maintained at a value needed for minimum drag during the spiral ascent. The angle of attack then is commanded to change to sustain the launch airspeed at release from the arm member 112. The release point will be parallel to the forward velocity track of the ship 106, thus taking advantage of the relative higher airspeed at the release point. After reaching the launch airspeed (approximately 130 kts) and the capture assembly 122 on the UAV aircraft 102 is releases from the attachment device 120 of the arm member 112. The UAV aircraft 102 is commanded to roll to wings level, and to maintain 1 g level flight or a desired climb-out flight path.

Figure 6:
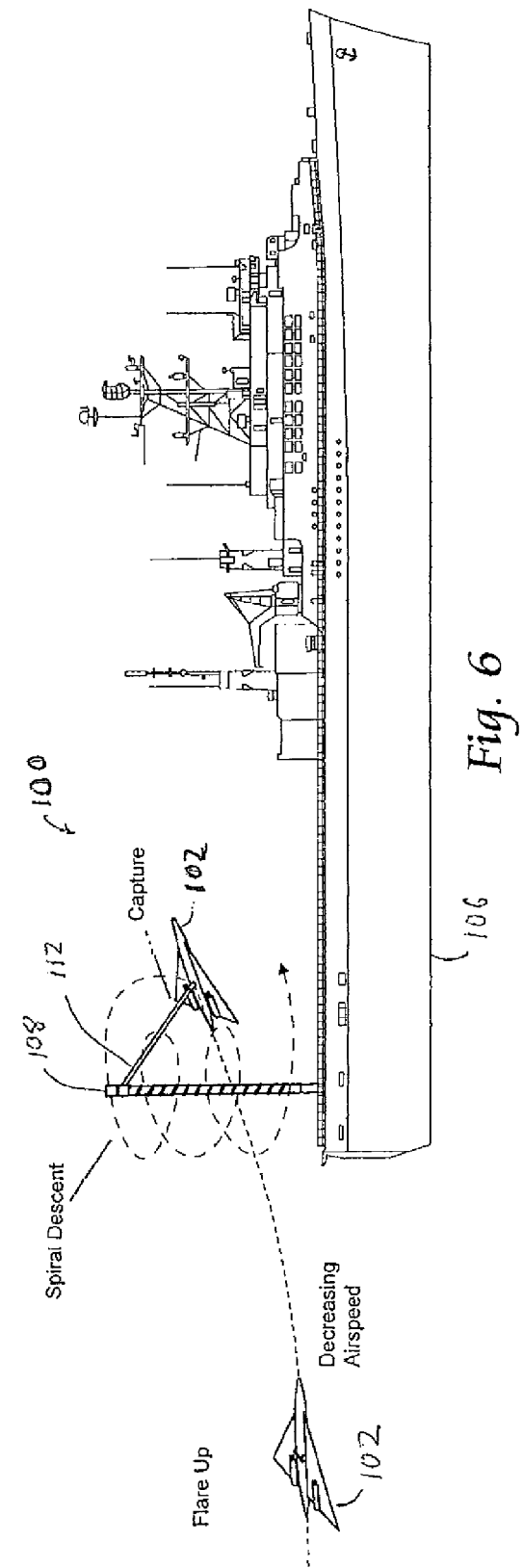
FIG. 6 is a side view depicting recover of a UAV aircraft using the system of FIG. 1.

Referring to FIG. 6, recovery of the UAV aircraft 102 using the system 100 will be described. Again, flight control of the UAV aircraft 102 such as adjusting the flight control surfaces and adjusting airspeed during the recovery of the UAV aircraft 102 may be accomplished remotely or programmed into the control system of the UAV aircraft 102.

When returning to the ship 106, the UAV aircraft 102 is commanded to fly a special landing approach trajectory behind the ship 106. The flight path is designed to remove energy from the UAV aircraft 102 prior to the landing so as to permit a pickup by the arm member 112 of the system 100. Prior to the landing, the arm member 112 is positioned 90 degrees from the centerline of the main deck 104, and at the top of the pole member 108. The attachment device 120 of the arm member 112 is set to capture the capture assembly 122 on the UAV aircraft 102.

To reduce the energy of the UAV aircraft 102 for landing, the UAV aircraft 102 is slowed to airspeed well below cruise airspeed at the hook capture point. This is accomplished by commanding the UAV aircraft 102 to fly an approach path of approximately a negative 3 degrees glide slope behind the ship 106, reaching a minimum altitude of 25 feet, and then commanding a sharp flare pull-up while commanding idle thrust. This will give a climb with a rapid decrease in airspeed, but still with sufficient airspeed for precision flight path control. The flight path of the UAV aircraft 102 is positioned to intersect the target for capture by the arm member 112 at airspeed between 40 kts to 30 kts. Since the ship 106 is also moving at approximately 30 knots, there will be a reasonable capture window. Motion of the arm member 112 and pole member 108 can occur during the landing approach due to ship motion heave and sway. This motion is compensated by flight path corrections from the control system of the UAV aircraft 102, resulting in synchronous motion of the flight path with the attachment device 120 of the arm member 112 during the final portion of the approach.

As the UAV aircraft 102 nears the arm member 112, a visual sensor 124 on the UAV aircraft 102 is activated to monitor and update the relative position of the capture assembly 122 to the attachment device 120 of the arm member 112. The capture assembly 122 on the UAV aircraft 102 is extended upward on a pivot boom 122A so that any contact of the pivot boom 122A by the attachment device 120 of the arm member 112 will result in capture of the UAV aircraft 102. This allows for a greater capture. The capture area is the target area that is required to be met by the UAV flight path control. The target area is within the flight path guidance capability of the UAV aircraft 102 using either shipboard radar to measure the position and velocity of the UAV aircraft 102, and with data link steering commands sent back to the UAV aircraft 102. Another method is to use Differential GPS positioning and velocity data obtained from the sensors on the UAV aircraft 102 and on the ship 106.

The arm member 112 is free to pivot after the hook capture, resulting in a descending circular spiral with the control surfaces extended combined with braking action from the arm member 112 to reduce airspeed to acceptable levels as the UAV aircraft 102 descends to a stop at the main deck 104. The attachment device 120 of the arm member has a damper device to absorb the capture loads. The damper device is adjustable for the size or gross weight of the UAV aircraft 102.

The system 100 offers expanded capabilities for UAV aircraft 102 operations, especially fixed wing UAV aircraft 102, providing safe and reliable control in low visibility weather, day or night operations, and control during very rough sea conditions that cause large motions of the ship 106 during recovery operations. With the system 100, shipboard launch and recovery operations can be equivalent to current CVA operations of manned aircraft. The system 100 replaces the large landing deck surface and the shipboard operator that would send guidance commands to the UAV aircraft 102 during the final approach, a task that is extremely difficult in landings in high seas and in low visibility conditions. Moreover, using the system 100 eliminates the need for landing gear, flaps, and other high lift devices on the UAV. Use of low speed airborne capture reduces the structure required for landing deck impact and eliminates the large horizontal loads for catapult launch and for hook capture of a deck cable upon landing. These factors will significantly reduce the weight and cost, and increase reliability and mission capability of the UAV aircraft 102.

While embodiments of the disclosure have been described in terms of various specific embodiments, those skilled in the art will recognize that the embodiments of the disclosure can be practiced with modifications within the spirit and scope of the claims.

What is claimed is:

1. A system to launch and recover an Unmanned Aerial Vehicle (UAV) aircraft comprising:
    a pole member attached to a deck of a ship;
    an arm member attached to the pole member and extending away from the pole member in an approximately horizontal direction, the arm member being able to move rotationally around the pole member and vertically up and down the pole member; and
    an attachment mechanism attached to a distal end of the arm member for releasably holding, launching, and capturing the UAV aircraft;
    wherein momentum of the UAV aircraft causes the arm member to move rotationally around and vertically on the pole member when the UAV aircraft is coupled to the attachment mechanism.

2. A system to launch and recover an Unmanned Aerial Vehicle (UAV) aircraft in accordance with claim 1 further comprising a capture assembly attached to the UAV aircraft to aid in the attachment mechanism capturing the UAV aircraft.

3. A system to launch and recover an Unmanned Aerial Vehicle (UAV) aircraft in accordance with claim 2 wherein the capture assembly is attached to the UAV aircraft and positioned near a center of gravity of the UAV aircraft.

4. A system to launch and recover an Unmanned Aerial Vehicle (UAV) aircraft in accordance with claim 2 further comprising a pivot boom coupled to the capture assembly to extend a capture area of the UAV aircraft by the attachment device.

5. A system to launch and recover an Unmanned Aerial Vehicle (UAV) aircraft in accordance with claim 1 further comprising a track formed on the pole member for guiding movement of the arm member coupled to the track.

6. A system to launch and recover an Unmanned Aerial Vehicle (UAV) aircraft in accordance with claim 5 wherein the track runs spirally from a top section to a bottom section of the pole member.

7. A system to launch and recover an Unmanned Aerial Vehicle (UAV) aircraft in accordance with claim 1 wherein the arm member further comprises a sleeve inserted onto the pole member, the sleeve slidably and rotatably connected to the pole member, the arm member attached to the sleeve and extending away from the sleeve in an approximately horizontal direction.

8. A system to launch and recover an Unmanned Aerial Vehicle (UAV) aircraft in accordance with claim 7 further comprising a track formed on the pole member, the sleeve positioned in the track, the track guiding movement of the arm member coupled to sleeve.

9. A system to launch and recover an Unmanned Aerial Vehicle (UAV) aircraft in accordance with claim 1 wherein the pole member is located approximately on a centerline of the ship.

10. A method for launching an Unmanned Aerial Vehicle (UAV) aircraft comprising:
 attaching the UAV aircraft to an approximately horizontal arm member, the approximately horizontal arm moveably coupled to an approximately vertical pole member;
 moving the horizontal arm vertically in a spiral direction up the approximately vertical pole member; and
 releasing the UAV aircraft from the approximately horizontal arm member when the UAV aircraft reaches launch airspeed.

11. The method of claim 10 wherein moving the horizontal arm in a spiral direction further comprising activating a propulsion system of the UAV aircraft to move the horizontal arm in the spiral direction on the approximately vertical pole member.

12. The method of claim 10 further comprising adjusting flight control surfaces of the UAV aircraft to minimize stress on a surface of the UAV aircraft attached to the approximately horizontal arm member.

13. The method of claim 10 further comprising adjusting an angle of attack of the UAV aircraft to sustain the launch airspeed at release from the arm member.

14. The method of claim 10 wherein attaching the UAV aircraft to an approximately horizontal arm member further comprising positioning the UAV aircraft to a location approximately 90 degrees to a centerline of a main deck and is approximately perpendicular to the arm member during a ship launch of the UAV aircraft.

15. A method of recovering an Unmanned Aerial Vehicle (UAV) aircraft comprising:
 rotating an arm member on an approximately vertical pole member to a positioned approximately 90 degrees from a centerline of a deck, and at a top section of the approximately vertical pole member;
 capturing the UAV aircraft at a distal end of the arm member; and
 descending the arm member in a circular spiral down the vertical pole to reduce airspeed of the UAV aircraft.

16. The method of claim 15 further comprising extending a capture assembly on the UAV aircraft on a pivot boom to increase capture area of the UAV aircraft.

17. The method of claim 16 further comprising activating a visual sensor on the UAV aircraft to monitor and update relative position of the capture assembly to the attachment arm member.

18. The method of claim 15 further comprising reducing airspeed of the UAV aircraft prior to capturing the UAV aircraft at a distal end of the arm member.

19. The method of claim 18 further comprising controlling the UAV aircraft to fly a sharp flare pull-up while commanding idle thrust prior to capturing the UAV aircraft at a distal end of the arm member to reduce airspeed.

20. The method of claim 15 further comprising controlling an approach flight path of the UAV to synchronize with a motion of a capture device located on the arm member.

* * * * *